United States Patent [19]
Ash et al.

[11] Patent Number: 5,955,562
[45] Date of Patent: Sep. 21, 1999

[54] SURFACE DERIVATIZATION OF POLYKETONES POLYMERS

[75] Inventors: Carlton Edwin Ash, Sugar Land; Donald Ross Kelsey, Fulshear, both of Tex.

[73] Assignee: Shell Oil Company, Houston, Tex.

[21] Appl. No.: 08/995,692

[22] Filed: Dec. 22, 1997

Related U.S. Application Data

[60] Provisional application No. 60/034,143, Dec. 23, 1996.

[51] Int. Cl.⁶ .................................................... C08G 12/00
[52] U.S. Cl. .......................... 528/220; 528/225; 528/229; 528/392; 568/387; 568/412; 568/413
[58] Field of Search ..................................... 528/220, 225, 528/229, 392; 568/387, 412, 413

[56] References Cited

U.S. PATENT DOCUMENTS

| | | |
|---|---|---|
| 4,879,358 | 11/1989 | Kastelic . |
| 5,034,431 | 7/1991 | Hanley . |
| 5,037,944 | 8/1991 | Smaardijk et al. . |
| 5,225,523 | 7/1993 | Drent et al. . |
| 5,227,465 | 7/1993 | Drent . |
| 5,359,028 | 10/1994 | Drent et al. . |
| 5,369,170 | 11/1994 | Weinkauf . |
| 5,405,700 | 4/1995 | Weinkauf et al. . |

OTHER PUBLICATIONS

WPI, Abstract Accession No. 96–481035/48 & JP 08/0244158A (Kuraray) Sep. 24, 1996 (see abstract).
European Search Report dated Mar. 16, 1998.

*Primary Examiner*—Duc Truong
*Attorney, Agent, or Firm*—Todd F. Volyn

[57] ABSTRACT

A alternating aliphatic polyketone polymer is surface derivatized to alter the surface properties of an article without affecting the bulk properties of the polymer it is made from. Derivitization may be done with reducing agents and/or silylating agents. Articles so produced display a range of improved properties including reduced wettability and improved tribological properties such as lubricity and wear resistance.

13 Claims, No Drawings

SURFACE DERIVATIZATION OF POLYKETONES POLYMERS

This application claims the benefit of U.S. Provisional Application No. 60/034,143 filed Dec. 23, 1996, the entire disclosure of which is hereby incorporated by reference.

FIELD OF THE INVENTION

The invention relates to aliphatic polyketone polymers.

BACKGROUND

The behavior of fabricated parts made from polymers results from a combination of properties attributable to both the bulk and surface properties of the polymer used. Mechanical properties are largely a function of the bulk material. Other properties can be attributed largely the result of the surface chemistry of the polymer. Such properties can include wettability, lubricity, barrier properties, chemical resistance, and UV weathering.

Polymers of carbon monoxide and ethylenically unsaturated hydrocarbons commonly referred to simply as aliphatic polyketones (hereafter, "polyketones") have been known for some time. High molecular weight alternating polyketones are of considerable interest because they exhibit a good overall set of physical and chemical properties. This class of polymers is disclosed in numerous U.S. patents assigned to Shell Oil Company exemplified by U.S. Pat. Nos. 4,880,865 and 4,818,811 which are incorporated herein by reference. These polymers are relatively high molecular weight materials having a breadth of useful properties giving them established utility as premium thermoplastics in the production of shaped articles such as gears, bearings, pipes, hose, connectors, fiber and parts for the automotive industry. The polymers display high strength, rigidity, and toughness among other favorable properties which they retain under a wide range of conditions such as temperature, moisture, and the presence of harsh chemical agents. For example, thinly molded parts comprised of polyketones have shown excellent property retention in concentrated caustic solutions. While surface discoloration can occur, bulk properties are largely retained. This makes them well suited for applications in aggressive environments such as in protective seals for the internal components of batteries.

The reactivity of polyketone groups has been used to make an array of polymeric materials with different bulk properties. For example, the introduction of other monomeric units or the modification of the polyketone backbone has resulted in the production of polymers having at least in part, polypyrrole, polyalcohols, polyester, polyfuran, polynitrile, and/or polyamine structures; each with new processing and use requirements. For example, the following patents disclose the reactions indicated:

European Patent 400,903:

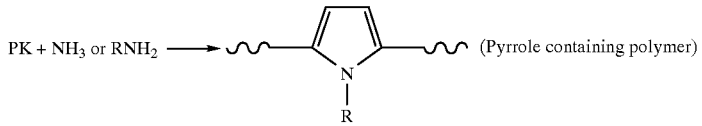

U.S. Pat. No. 3,979,374:

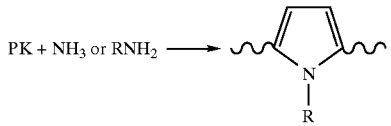

U.S. Pat. No. 5,096,985:

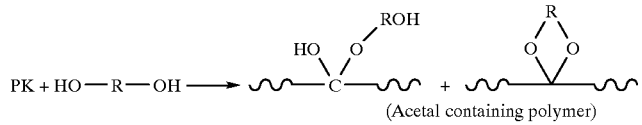

U.S. Pat. No. 5,300,596:

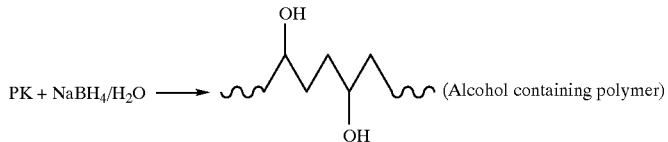

U.S. Pat. No. 5,140,080:

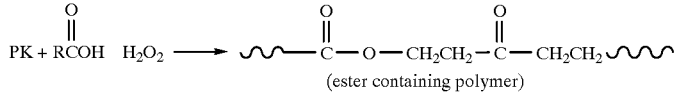

U.S. Pat. No. 4,929,711 discloses a similar reaction in which a peracid is used as a reactant.

U.S. Pat. No. 2,495,284:
PK + HCN ⟶

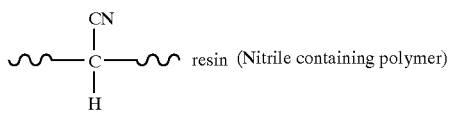

-continued

European Patent 413,081A2:
PK + H₂SO₄ or ClSO₃H ⟶ Sulfonated Polymer

U.S. Pat. No. 3,979,373 discloses the reaction of a polyketone with phosphoric or sulfuric acid to produce a polyfuran.

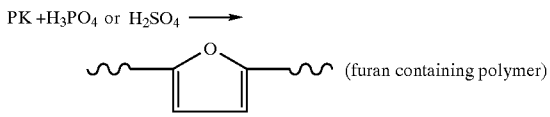 (furan containing polymer)

U.S. Pat. No. 2,436,269:
PK + HNO₃/Vandium ⟶ Chain scission to low diacids or diesters U.S. Pat. No. 2,457,271:
PK + NaOH/H₂O/Org. Solvent ⟶ PK w/unsaturati U.S. Pat. No. 2,846,406:

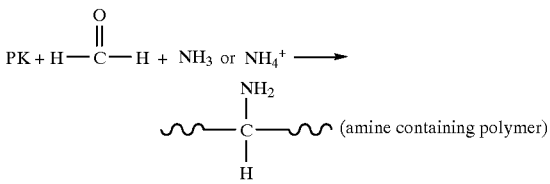 (amine containing polymer)

U.S. Pat. No. 2,457,279 describes the preparation of a reduced polyketone polymer through the addition of hydrazine to a polyketone. U.S. Pat. Nos. 4,616,072 and 4,687,805 describe the acidic and basic halogenation of polyketone polymers. Moreover, U.S. Pat. Nos. 5,225,523 and 5,227,465 discuss the production of low molecular weight polymers having a hybridized backbone. The modifications all relate to the bulk properties of the polymer in question. Not every polyketone presented above was, in fact, a alternating polyketone but the principle of altering the polymer backbone was seen in each.

Another means for affecting the properties of a polymer are through combination with another polymer. Frequently, this is accomplished by blending or by making multilayer composite structures. The latter are frequently utilized when one polymer can provide barrier properties while another polymer can provide mechanical and chemical resistance properties. These composites require surface adhesion between polymers which are not always mutually attractive. Thus, a mutually adhering tie-layer is often used. In the case of polyketones, amine modified polymers are particularly effective in this regard. For example, U.S. Pat. No. 5,369,170 discloses the use of an amine modified polyolefin together with a polyketone. Most aminated polymers can be combined with polyketones in this fashion. Indeed, any number of such layers are possible and can be readily accomplished through the use of multi-layer extrusion techniques well known in the art. Examples include three layer systems of polyketone/tie-layer/polyethylene and polyketone/tie-layer/polyamide-12. Five layer systems such as polyolefin/tie-layertolyketone/tie-layer/polyolefin present another example of this technology. This approach to polymer modification results in the overall property set of the composite having the average of the properties of the two (or more) polymers that are combined in layers with an improvement in some properties such as barrier or chemical resistance properties relative to the use of a single polymer. Thus, these composites find utility in automotive applications such as fuel lines, fuel tanks, and various industrial containers.

In many cases, it would be desirable to fabricate parts from alternating polyketones which exhibit different surface behaviors from those of the bulk polymer. Articles made in this manner would display the favorable property set attributable to the polymer bulk. However, other properties such as wettability, lubricity, adhesion, UV degradation resistance, barrier properties, and chemical resistance could be selectively improved to enhance to overall utility of the part so made. U.S. Pat. No. 5,405,700 discloses surface modification of polyketones with multifunctional amines which are then bonded to an epoxy resin. While this affords the polyketone with certain improvements in its surface effects, the presence of the epoxy resin also significantly affects the bulk properties of the overall composition. It would be desirable to produce materials having the bulk properties of polyketones and yet displaying improved surface properties.

SUMMARY OF THE INVENTION

The present invention is a surface derivatized polyketone polymer which can be made hydrophobic or hydrophilic and which can be made to exhibit improved properties such as tribological properties and relative to polyketone polymers which have not been surface derivatized. The present invention is also a process for derivatizing the surface of polyketone polymers by contacting an article comprising polyketone with various reagents.

In one aspect of this invention a polyketone having a silylated surface is prepared.

In another aspect of this invention the tribological properties of a polyketone article are improved without significantly affecting its bulk properties.

DETAILED DESCRIPTION

Generally speaking, this invention is practiced by treating parts made from polymers comprising alternating polyketone polymers with reagents which alter the properties of the polymer predominantly at the surface. The polyketone polymers which are employed in this invention are of a alternating structure and contain substantially one molecule of carbon monoxide for each molecule of ethylenically unsaturated hydrocarbon. It is possible to employ a number of different ethylenically unsaturated hydrocarbons as monomers within the same polymer but the preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene. Additional monomers can also be employed and still come within the scope of polyketone polymers described herein. Such polyketone polymers are aliphatic in that there is an absence of aromatic groups along the polymer backbone. However, alternating polyketones may have aromatic groups substituted or added to side chains and yet still be considered alternating aliphatic polyketones. Moreover, the polyketones used in this invention can be blends with any number of other polymers and materials. Some blends could incorporate the use the aromatic materials and polymers. Nevertheless, the polyketone polymer component is still considered to be of the alternating aliphatic type.

When the preferred polyketone terpolymers are employed, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

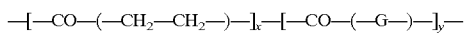

where G is the moiety of ethylenically unsaturated hydrocarbon of at least three carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(—CH$_2$—CH$_2$—)— units and the —CO—(—G—)— units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g. The backbone chemistry of aliphatic polyketones precludes chain scission by hydrolysis. As a result, they generally exhibit long term maintenance of their property set in a wide variety of aqueous environments. This is in contrast to a material such as nylon 6,6 which suffers the consequences of both hydrolysis and more severe plasticization.

Preferred methods for the production of the polyketone polymers are illustrated by U.S. Pat. Nos. 4,808,699 and 4,868,282 to Van Broekhoven, et. al. which issued on Feb. 28, 1989 and Sep. 19, 1989 respectively and are incorporated herein by reference. U.S. Pat. No. 4,808,699 teaches the production of alternating polymers by contacting ethylene and carbon monoxide in the presence of a catalyst comprising a Group VIII metal compound, an anion of a nonhydrohalgenic acid with a pKa less than 6 and a bidentate phosphorous, arsenic or antimony ligand. U.S. Pat. No. 4,868,282 teaches the production of random terpolymers by contacting carbon monoxide and ethylene in the presence of one or more hydrocarbons having an olefinically unsaturated group with a similar catalyst.

Modifications proposed in this invention can be depicted graphically as follows:

Where: S=Modified alternating ketone surface structure
PK=is a polyketone as described above
|=Polyketone surface The surface of the polymer, as used throughout this specification, includes the portion of the polymer in direct contact with the environment and, a portion of the polymer in which reactivity of the functional groups thereon directly affect the portion of the polymer in direct contact with the environment. That is, there is portion of the polymer which is to be considered "surface" which is not in direct contact with the environment. This can extend as far as 5 mils beneath the portion of the polymer in direct contact with environment. Modified surface S may be generated by 1) crosslinking polymer chains, 2) changing the regular ketone structure such as through reduction, oxidation, and/or addition type chemistries, or 3) covalently, ionically, or physically grafting pendant groups to the PK structure or an intermediate made prior to grafting. Finally, hybrids of the three reactions can also be employed. The foregoing processes are referred to herein as surface derivatization of the polyketone polymer. Surface derivitization of polyketone is possible because of the high density of functional groups. This is unlike the situation encountered in polyolefins which typically lack the high density of functional groups and, like many condensation polymers, are nevertheless readily subject to hydrolysis.

Examples of reactions that can be exploited in this regard include, but are not limited to, alkylation, arylation, acylation, halogenation, amination, sulfonation, sulfation, thiolation, ketalization, hydrogenation, oxidation, cyanation, silylation, epoxidation, dehydration, condensation, hydroxylation, and metallization reactions. Reactions can be carried out alone or in various combinations. Typical examples are depicted below:

a. Enolate Condensation

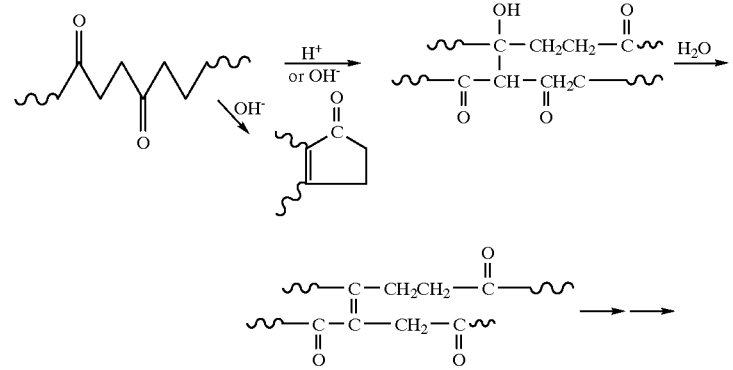

Further condensation
and aromatization b. Furanization
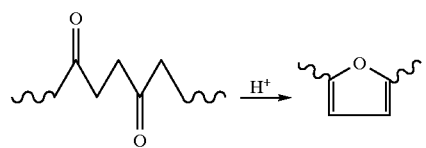
c. Amination
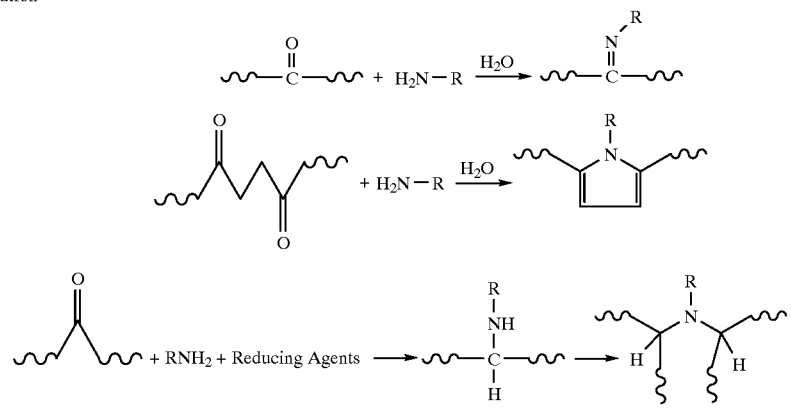
d. Reduction
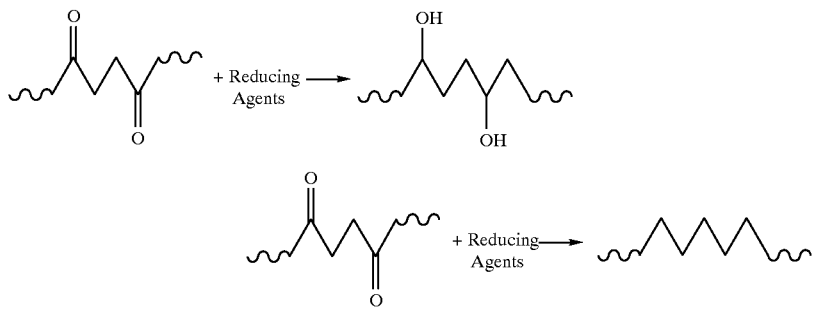
e. Oxidation
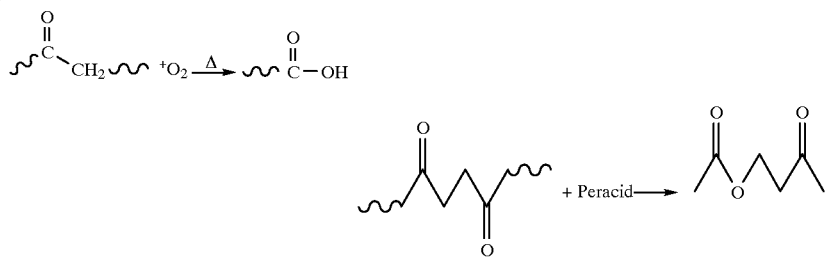
f. Ketalization
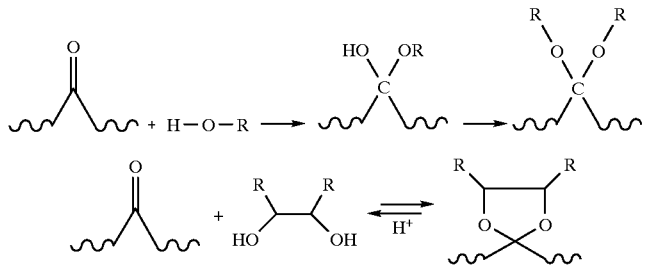
g. Alkylation
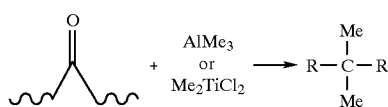

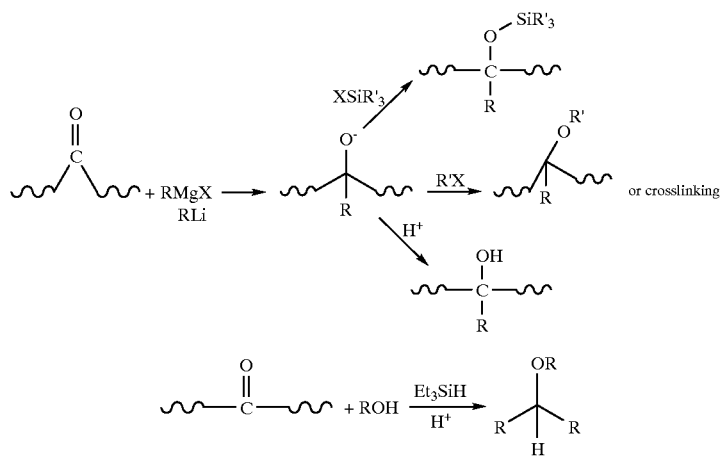
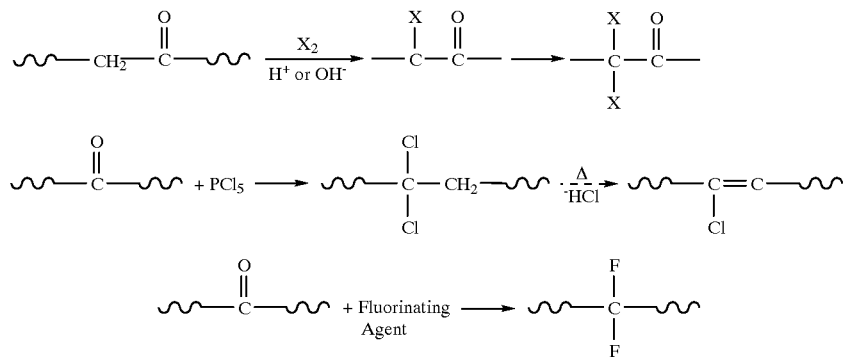
h. Halogenation
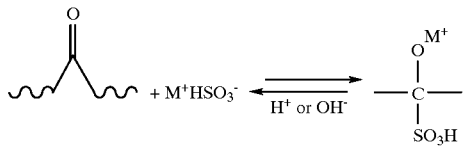
i. Sulfonation
j. Sulfur Reactions
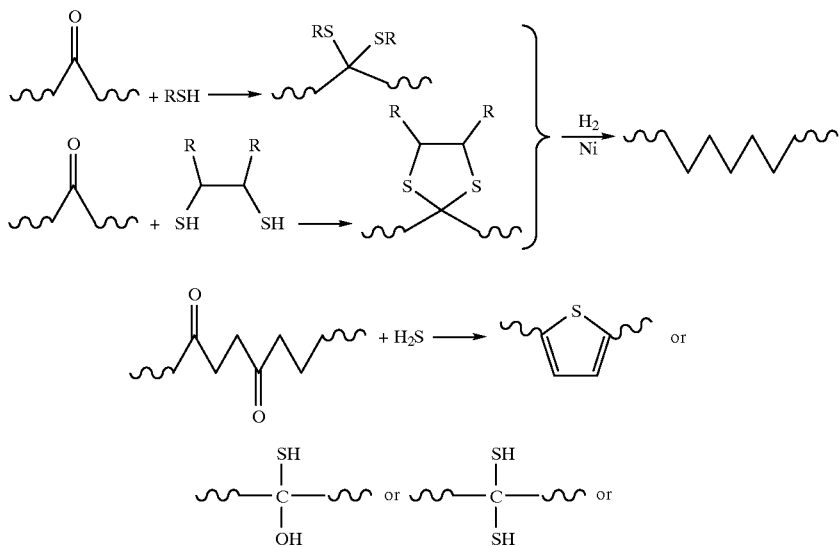

-continued

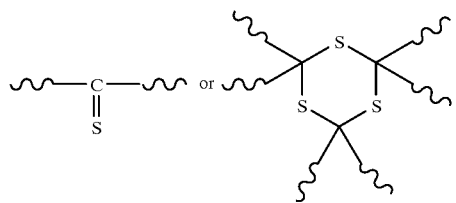

k. Ylid Reactions

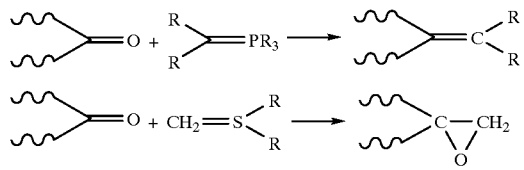

L. Cyanation

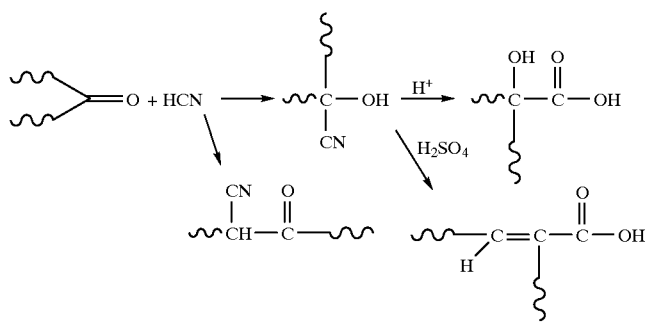

M. Enol ether reaction

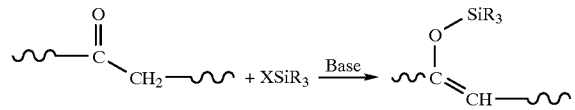

N. Radical initiated additions

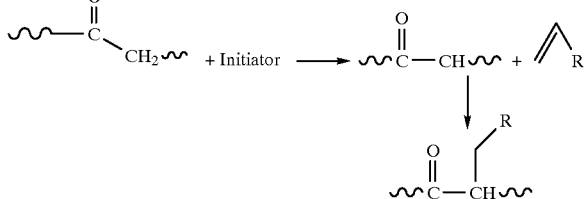

Grafting reactions can be graphically illustrated as follows:

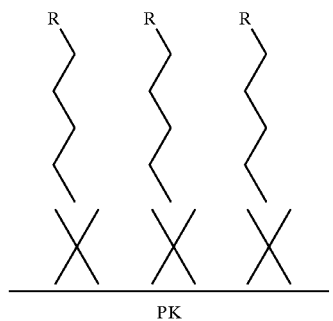

R can be organic and/or inorganic in composition. Further, it can be monomeric or polymeric in nature. X is a graft point which can be created through a variety of chemistries including reactions forming, for example, ketals, thioketals, imines, pyrroles, esters, sulfinates, metal oxides, and oxazolidines.

More particularly, the surface property improvements of this invention are accomplished through reduction of ketone functional groups and/or silylation.

Silylation can be carried out in a number of ways. One is to react in one step, polyketone surface with a primary amine containing amino silane such as aminomethyl-, aminoethyl-, or aminopropyl silanes. Another method which can be employed is to first reduce either a portion or all of the surface ketone groups to alcohols which can then be reacted with a variety of silylating agents such as mono-, di-, or tri-halogenated silanes or alkoxy silanes. Such silylating agents can be beneficial in rendering alkyl, aryl, and/or fluoroalkyl surfaces hydrophobic and self lubricating thus increasing the utility of such materials in a number of applications. Optionally, a silicon tetrahalogen compound can be reacted with a reduced polyketone surface and subsequently reacted with water to produce a silica surface.

Reducing agents useful in practicing the two step silylation method include; stochiometric and catalytic reducing agents. A stochiometric reagent, as used in this specification, is a reagent which when applied to a polyketone surface will reduce one ketone group on an equivalent basis with the number of hydrogens that the reagent is free to donate. These include, for example, $LiAlH_4$, $LiBuBH_3$, $NaBH_4$, $NaBH_3CN$, $LiBH_4$, $KBH_4$, $K(OiPr)_3BH$, $Na(OMe)_3BH$, $Zn(BH_4)_2$, $Bu_3SnH$. $NaBH_4$ is most preferred. Catalytic reagents include, for example, Meerwein-Ponndorf-Verelyreductions and hydrogenation in the presence of a nickel catalyst as described in U.S. Pat. No. 5,071,926 which is incorporated herein by reference.

Typically, a stochiometric excess of reducing agent is used (basis ketone groups at the polymer surface). It is also possible to use substantially less than a stochiometric quantity of reducing agent and still obtain a surface sufficiently derivatized to yield desirable surface properties. Indeed, as little as 5% molar (basis ketone groups at affected polymer surface) can bring about desirable surface changes. Nevertheless, a molar excess of reducing is preferred.

The reducing agent is simply applied to the surface of the part in a manner sufficient to cover the surface to be derivatized. This can include dipping the part in the reagent, which is the preferred method of application. Even though the part may be completely immersed in an excess of reducing agent, not every ketone group will ordinarily be reduced. Ordinarily, this process is conducted with a part completely formed into the useful article. However, it is also possible to derivative the surface of the polyketone at other stages in the production of an article. For example, one or more surfaces of a polyketone part can be surface derivatized and then the part further processed, as for example, into a multilayer structure with other polymers.

Once applied, the reducing agent is given sufficient time to react with ketone groups at the surface of polyketones. This can take place nearly instantaneously or it can take substantially longer. It is preferred that the reagent used to derivatize the surface of the article remain in contact with the surface for at least an hour at room temperature. It is most preferred that the reagent remain in contact for at least 72 hours at room temperature where the reagent is aqueous $NaBH_4$. Beyond this point, the surface properties of the material are unlikely to be amenable to substantial improvement. Temperatures at which the surface reaction occurs are generally between about 0 and 150° C. under aqueous conditions. Higher and lower temperatures are possible when the process is conducted under nonaqueous conditions. Further, as one skilled in the art will readily recognize, the boiling point of the reagents may necessitate higher than ambient process pressures. It is most preferred that the reaction is conducted at about 23° C.

The reducing agent may be applied to the polyketone part in the presence of a solvent. Solvent selection is well within the grasp of one of ordinary skill in the art. Only hexflouroisopropanol (HFIP) is currently known to dissolve polyketone. Under ordinary circumstances, one could simply choose any other solvent provided that the reducing agent is soluble in the solvent. For example, in a two-step process in which the polyketone article is first reduced to an alcohol at its surface, the reducing agent such as $NaBH_4$, can be mixed with water.

Parts are fabricated by processing polyketone polymers according to conventional methods such as extrusion and injection molding. Such parts have a wide variety of uses as engineering thermoplastics including gears, automotive parts, pulleys, structural members, and electrical connectors among other uses.

The invention is further illustrated by the following non-limiting examples.

Example 1 (Polyketone Formation)

A terpolymer of carbon monoxide, ethylene, and propylene was produced in the presence of a catalyst composition formed from palladium acetate, the anion of triflouroacetatic acid and 1,3-bis(diphenylphosphino)-propane. The melting point of the linear terpolymer was 220° C. and it had a limiting viscosity number (LVN) of 1.8 measured at 60° C. in m-cresol.

Example 2 (Surface Reduction to Alcohols)

In this example, polyketone polymer as described in example 1 was injection molded into ASTM D638, type V tensile bars. Five injection molded bars were exposed to slurries of 20 wt % $NaBH_4$ in water (ca. 100 mL) for 72 hours and then rinsed with dilute (0.1 wt %) HCl, followed by deionized water rinsing. The surfaces exhibited a slightly tacky surface when wet such that pressing specimens together caused them to adhere. Drying was carried out on separated specimens at 60° C. in a vacuum oven under nitrogen flush. After drying, the surfaces were again solid and resembled in appearance the initial untreated samples.

IR analysis (attenuated total reflectance, 45°) showed that surface hydroxyl groups were indeed present with a broad absorption observed at about $3300$ $cm^{-1}$. A carbonyl band was still present at $1692$ $cm^{-1}$ indicating that not all ketone groups in the polymer had been reduced to alcohols. The hydroxyl containing surfaces were very wettable (hydrophilic) displaying an observable smaller contact angle with water than a control untreated sample. Accurate contact angle measurements were not possible due to slight surface roughness.

Samples which were prepared and rinsed as above, but not dried showed bonding to themselves or paper. Wet, treated tensile bars were pressed together (two bars) or pressed against a paper towel and then dried together at 60° C. in a vacuum oven. After drying a very strong bond resulted either between two treated tensile specimens or to paper. The paper could not be removed without tearing, but if the sample was rewetted the paper could be removed cleanly. Lap shear tensile tests were conducted on two self-adhering tensile bars using an Instron tensile tester. The lap shear tensile strength was 2550 psi and the failure at the interface showed cohesive failure. If the same type adhering samples were instead placed in hot (80° C.) water for 1 hour, the samples lost all adhesion between themselves.

This example demonstrated the production of a polyketone polymer with a wettable surface and reversible adhesion (via the introduction of moisture).

Example 3 (Secondary Silylation Treatments)

Polyketone specimens which were surface reduced with $NaBH_4$ as described in Example 2 to produce alcohol containing surfaces were submitted to a second surface reaction. Type V tensile specimens treated with $NaBH_4$ were dried and then further treated with either alkyl or perfluoroalkyl silyl chlorides. Three different silylating reagents were used: "SURFASIL" brand siloxane (tetrasiloxane-1,7-dichloro-1,1,3,3,5,5,7,7-octamethyl available from Pierce Co.: CAS#2474-02-4), 1H,1H,2H,2H-perfluorooctyldimethylchlorosilane, 1H,1H,2H,2H-perfluorooctylmethyldichlorosilane, or 1H,1H,2H,2H-perfluorooctyltrichlorosilane all supplied by PCR, Inc.

Silylation treatments were carried out by immersing test specimens in either a toluene solution of 10% "SURFASIL" or 5% of the corresponding fluoroalkylsilane for 24 hr at room temp. The specimens were then thoroughly rinsed with toluene and then rinsed with acetone to remove any unreacted silylating reagent. The specimens were then dried at 50° C. under vacuum with a nitrogen purge for 24 hours. The specimens were unchanged in surface appearance to an untreated control. Surface treated tensile specimens were also submitted to tensile testing. There was no change in yield strain or yield stress relative to the untreated control.

By placing water droplets on these surfaces with a 1 mL disposable pipette it was observed that significantly larger contact angles resulted than that of an untreated control, i.e. the droplets formed beads on the polymer surface. Again, absolute contact angle measurements on these samples was not possible due to some surface roughness resulting from the initial $NaBH_4$ reduction step. The increased "beading" of water droplets after silylation treatments demonstrates a hydrophobic surface has been prepared.

This example illustrated the production of a polyketone polymer with a surface which can be made wettable (reduction to alcohol at the surface) and then hydrophobic (modification with silylating agent).

Example 4 (Tribological Tests on Silylated Surface Polyketones)

In this example, surface silylation of polyketone surfaces was conducted as in Example 3 with the exception that surface derivitization was carried out on injection molded thrust washer specimens such that tribological properties could be measured. Thrust washers (consistent with ASTM D-3702) were tested on a Falex Corporation computer controlled multispecimen test machine. Specimens were either tested without any surface treatment or treated as described in Table 1 to give a silylated surface. Falex testing was conducted with molded thrust washer specimens turning against 440-C steel washers with Rc hardness of 55–60 and a surface finish of 12–16 micro-inches AA (14–18 RMS).

Table 1 summarizes the results and the conditions applied to determine dynamic coefficient of friction (DCOF) of treated and untreated specimens. The Falex conditions applied for DCOF measurements were 70 lbs load and 10 ft/m velocity with a 3 hour test period prior to recording final measurements.

TABLE 1

Tribological properties.

| Sample # | Pretreatment[a] | Silylation[b] | DCOF | Temp. C |
|---|---|---|---|---|
| 1 | None | None | 0.49 | 54 |
| 2 | None | Surfasil | 0.48 | 51 |
| 3 | $NaBH_4/H_2O$ | Surfasil | 0.13 | 31 |
| 4 | $NaBH_4/H_2O$ | Surfasil | 0.17 | 34 |

TABLE 1-continued

Tribological properties.

| Sample # | Pretreatment[a] | Silylation[b] | DCOF | Temp. C |
|---|---|---|---|---|
| 5 | $NaBH_4/H_2O$ | Fluoroalkylsilane | 0.15 | 32 |
| 6 | $NaBH_4/H_2O$ | Fluoroalklsilane | 0.16 | 33 |

[a]Pretreatment was to immerse polyketone specimens in a $NaBH_4$ water slurry (20 g $NaBH_4$/100 g $H_2O$) at room temperature for 72 hours.
[b]Fluoroalkylsilane silylating agent was 1H,1H,2H,2H-perfluorooctylmethyldichlorosilane.

Specimens # 3–6 demonstrate the advantage to lubricity (lower DCOF) upon having an alkyl or fluoroalkyl silyl agent bonded to the polyketone surface.

This example demonstrated an improvement in the tribological behavior of polyketone parts and articles upon silylation at the surface. Increased lubricity and reduced wear resulted from such treatment.

I claim as my invention:

1. An article comprising a manufactured part having a silylated surface and a bulk structure of alternating polyketone.

2. A method of reducing the wettability of a polyketone polymer article at its surface comprising reducing carbonyl groups at the surface of said polyketone polymer and silylating the reduced carbonyl groups.

3. The method of claim 2 wherein the carbonyl groups are reduced by contact with a reducing agent.

4. The method of claim 3 wherein the reducing agent is selected from the group consisting of $LiAlH_4$, $LiBuBH_3$, $NaBH_4$, $NaBH_3CN$, $LiBH_4$, $KBH_4$, $K(OiPr)_3BH$, $Na(OMe)_3BH$, $Zn(BH_4)_2$ and $Bu_3SnH$.

5. The method of claim 4 wherein the reducing agent is $NaBH_4$.

6. A method of improving the tribological properties of a polyketone polymer article comprising silylating the surface of said polyketone polymer.

7. The method of claim 6 comprising contacting said article with a silane until said article reacts with said silane at the surface of said article.

8. The method of claim 7 wherein the silane is an aminosilane.

9. The method of claim 8 wherein the silane is member of the group consisting of aminomethylsilanes, aminoethylsilanes, and aminopropylsilanes.

10. The method claim of claim 8 wherein said silane is present in a stochiometric excess to the ketone groups at the surface of said article.

11. The method of claim 7 further comprising the step of reducing the surface of said polyketone polymer prior to silylation.

12. The method of claim 11 wherein the reduction step comprises contacting said article with a reducing agent.

13. The method of claim 12 wherein the reducing agent is selected from the group consisting of $LiAlHK_4$, $NaBH_4$, $NaBH_3CN$, $LiBH_4$, $KBH_4$, $K(OiPr)_3BH$, and $Na(OMe)_3BH$.

* * * * *